Sept. 29, 1925.

F. C. TISCHHAUSER

PRESS

Filed Aug. 8, 1924

Inventor
F. C. Tischhauser,
By
Attorney

Sept. 29, 1925.  
F. C. TISCHHAUSER  
PRESS  
Filed Aug. 8, 1924  
1,555,723  
2 Sheets-Sheet 2

Inventor  
F.C. Tischhauser,  
By  
Attorney

Patented Sept. 29, 1925.

1,555,723

UNITED STATES PATENT OFFICE.

FREDRICK C. TISCHHAUSER, OF EDWARDSVILLE, ILLINOIS, ASSIGNOR OF ONE-ELEVENTH TO IRA VOYLES, ONE-ELEVENTH TO NOEL HOYLE, ONE TWENTY-SECOND TO JAMES JAMIESON, AND ONE TWENTY-SECOND TO JOHN YESNOSKY, ALL OF EDWARDSVILLE, ILLINOIS.

PRESS.

Application filed August 8, 1924. Serial No. 730,881.

*To all whom it may concern:*

Be it known that I, FREDRICK C. TISCHHAUSER, a citizen of the United States, residing at Edwardsville, in the county of Madison and State of Illinois, have invented certain new and useful Improvements in Presses, of which the following is a specification.

This invention relates to new and useful improvements in presses and more especially to presses for separating cottage cheese from the whey.

The primary object of my invention is to provide a simple and economical press of the above character, whereby large quantities of cottage cheese may be produced in a relatively short time.

A further object of my invention is to provide a device of this character, whereby the above result may be accomplished with the minimum labor, and consequently, the saving of much expense in this connection.

With the foregoing and other objects in view that will appear as the nature of my invention is better understood, the same consists in the novel features of construction, combination and arrangement of parts illustrated in the drawings and more particularly pointed out in the appended claims.

In the accompanying drawings, which are for illustrative purposes only and are therefore not drawn to scale:—

Figures 1, 2:
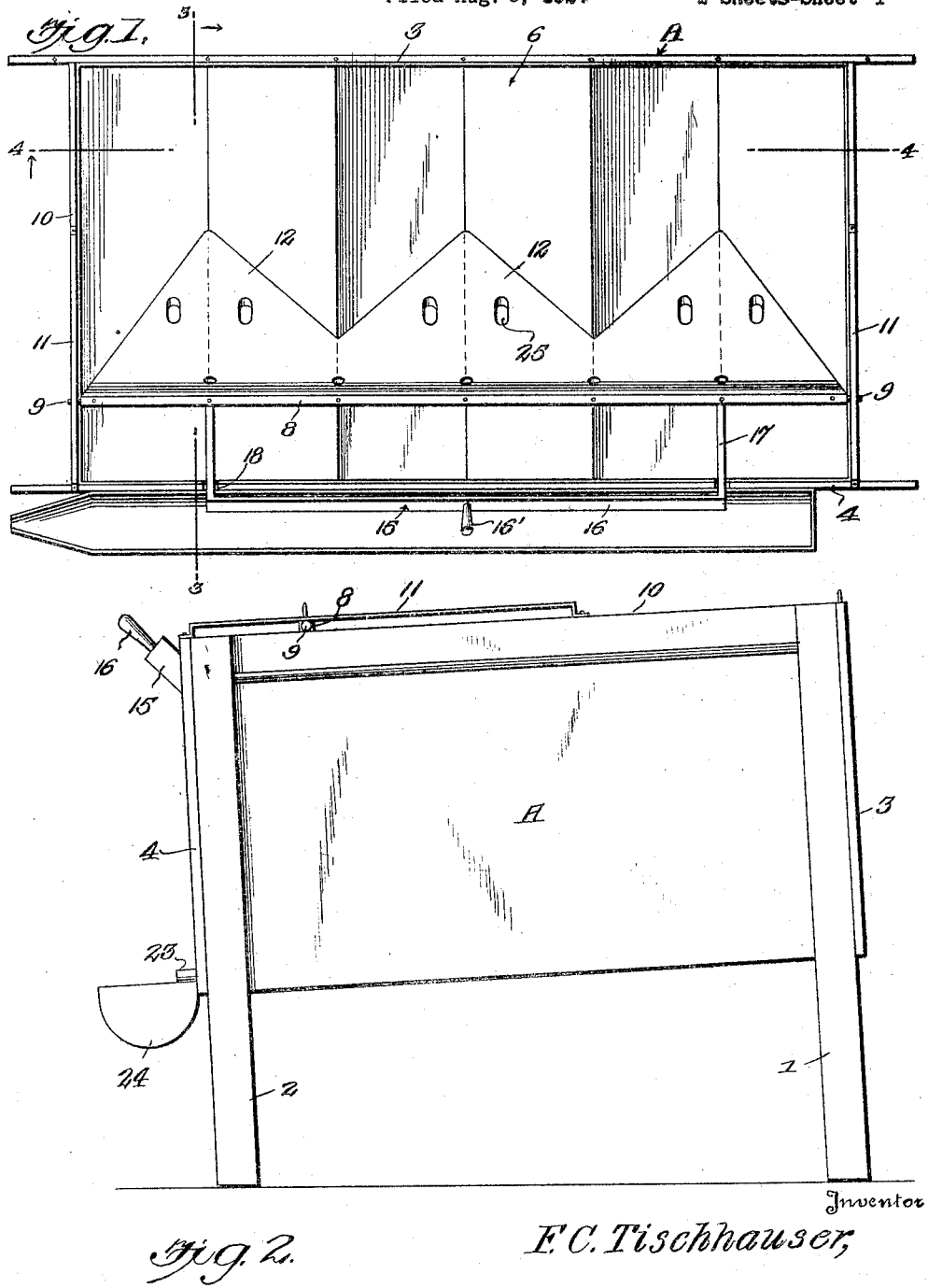
Figure 1 is a plan view of a cottage cheese press embodying my improvement.
Figure 2 is a side elevation.
Figure 3:
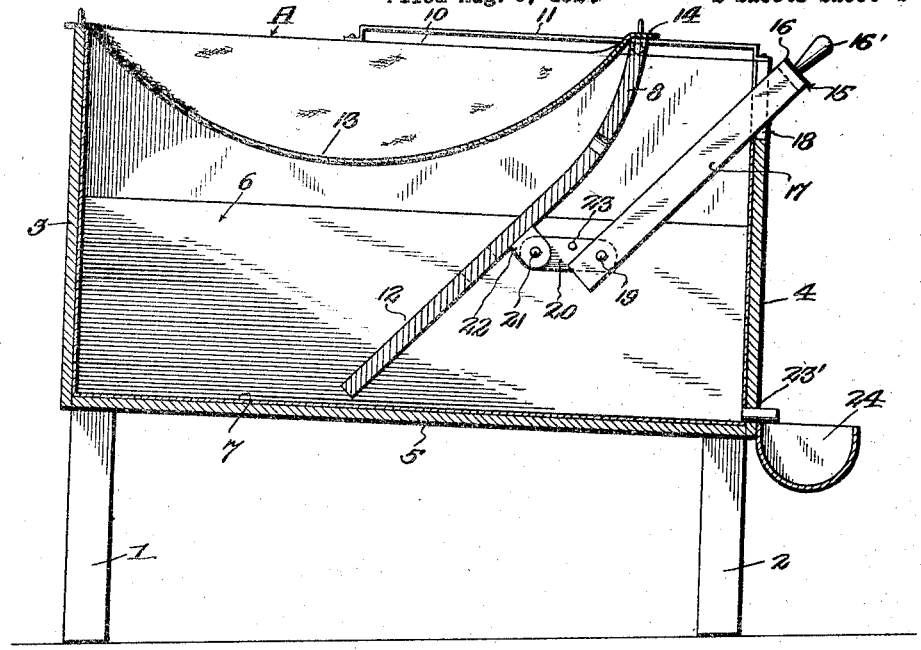
Figure 3 is a transverse section, taken on line 3—3 of Figure 1.
Figure 4:
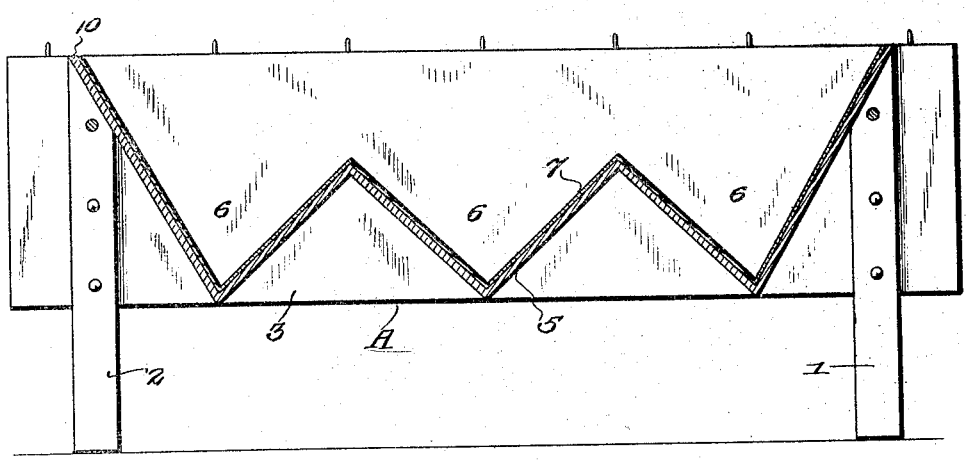
Figure 4 is a longitudinal section taken on line 4—4 of Figure 3.

Referring to the drawings for a more particular description of my invention and in which drawings like parts are designated by like reference characters throughout the several views, my improved press embraces an oblong vat or casing A, mounted on the supporting legs 1 and 2, and consisting of the straight side walls 3 and 4 and the corrugated bottom 5, forming three or more transversely disposed substantially V-shaped troughs 6. The vat is preferably provided with an inner lining 7, of sheet tin or other suitable material.

A rock bar 8, extends longitudinally of the vat and is formed at opposite ends with the cylindrical extensions 9, which work on the upper edges 10 of the side walls 3 and 4, beneath the guide strips or bars 11. Said rock bar is provided with 3 or more downwardly and rearwardly inclined V-shaped tongues or paddles 12, which work in the corresponding troughs 6 of the vat.

A rectangular strip 13 of cheese cloth or other suitable material is attached at three of its edges to the top of the vat, and at its remaining edge 14, to the upper edge of the rock bar 8. The rock bar and paddles are raised and lowered by the U-shaped operating member 15, whose body portion 16 is provided with a centrally disposed handle 16' and whose end portions 17 are fulcrumed at their outer ends in vertical recesses 18, formed in the upper edge of the side wall 4 of the vat, and pivoted at their inner ends, as at 19, to the horizontal links 20, which are in turn pivotally connected, as at 21, to brackets 22 carried by the end paddles. The links 20 are provided intermediate their ends with horizontal stops 23 adapted to be engaged by the end portions 17 of the operating member 15.

In practice, the cheese and whey are poured in upon the cheese cloth strip 13, and the cheese lifted up and pressed together by means of the paddles which facilitates the separation of the whey from the cheese. The whey collects in the V-shaped troughs of the vat and discharges thru the egress openings 23 into the metal trough 24, which is disposed longitudinally of the press at one side thereof. The paddles are also preferably provided with transverse openings 25 to facilitate the drainage of the whey from the cheese.

From the foregoing description, taken in connection with the drawings, it is thought that the construction, operation and advantages of my invention will be readily understood without requiring a more extended explanation.

Having described my invention, what I claim as new and desire to secure by Letters Patent, is:—

1. A cheese press of the character specified, comprising an elongated vat having a corrugated bottom, a rock bar pivoted at its ends on the vat and having paddles corresponding with and extending into the corrugations of the bottom, manually operated means for said rock bar and paddles, and a cheese cloth strip supported upon the top of the vat above the paddles and adapted to be raised by the latter to lift up and compress the cheese.

2. A press of the character specified comprising an elongated vat having a corrugated bottom, forming a plurality of substantially V-shaped transversely disposed troughs, a longitudinally disposed rock bar pivoted at its ends on the vat and having V-shaped tongues or paddles extending into the troughs of the bottom, a cheese cloth strip supported upon the top of the vat above the paddles and manually operated means for raising the rock bar and the paddles and a trough extending along the bottom and one side of the vat, said means comprising an operating member fulcrumed upon one wall of the vat and pivotally connected with the paddles.

3. A press of the character specified comprising an elongated vat having a corrugated bottom forming a plurality of substantially V-shaped transversely disposed troughs, a longitudinally disposed rock bar pivoted at its ends on the vat and having V-shaped tongues or paddles extending into the troughs of the bottom, a cheese cloth strip supported on the top of the vat above said paddles and adapted to be raised by the latter to lift up and compress the cheese and manually operated means for raising said paddles, said means comprising a U-shaped member fulcrumed upon one wall of the vat and pivotally connected at its ends to corresponding paddles.

4. A press of the character specified comprising an elongated vat having a corrugated bottom forming a plurality of substantially V-shaped transversely disposed troughs, a longitudinally disposed rock bar pivoted at its ends on the vat and having V-shaped tongues or paddles extending into the troughs of the bottom, a cheese cloth strip supported on the top of the vat above said paddles and adapted to be raised by the latter to lift up and compress the cheese and manually operated means for raising said paddles, said means comprising a U-shaped member fulcrumed upon one wall of the vat, horizontal links for pivotally connecting the ends of said operating member with corresponding paddles, and horizontal stops on said links adapted to be engaged by the end portions of said operating member.

In testimony whereof I affix my signature.

FREDRICK C. TISCHHAUSER.